United States Patent [19]

Remppel

[11] Patent Number: 5,316,632
[45] Date of Patent: May 31, 1994

[54] METHOD FOR IMPROVING EFFICIENCY OF ELECTRO-CHEMICAL CELLS

[76] Inventor: Dieter Remppel, P.O. Box 1749, Canmore, Alberta T0L 0M0, Canada

[21] Appl. No.: 50,803

[22] Filed: Apr. 22, 1993

Related U.S. Application Data

[63] Continuation-in-part of Ser. No. 735,349, Jul. 24, 1991, abandoned.

[51] Int. Cl.$^5$ .................... H01M 10/26; C25F 5/00
[52] U.S. Cl. .................... 204/146; 204/DIG. 3; 204/DIG. 4; 205/299; 205/300; 429/50
[58] Field of Search .................... 204/DIG. 3, DIG. 4, 204/146; 429/50; 205/299, 300

[56] References Cited

U.S. PATENT DOCUMENTS

| Re. 33,427 | 11/1990 | Vignaud | 429/50 |
|---|---|---|---|
| 2,840,521 | 6/1958 | Wasserman | 204/146 |
| 4,160,703 | 7/1979 | Bird et al. | 204/146 |
| 4,322,483 | 3/1982 | Tune | 429/50 |
| 4,942,100 | 7/1990 | Hunter et al. | 429/50 |
| 5,004,654 | 4/1991 | Hunter et al. | 429/50 |

*Primary Examiner*—John Niebling
*Assistant Examiner*—Arun S. Phasge
*Attorney, Agent, or Firm*—Richard J. Hicks

[57] ABSTRACT

A method for improving the efficiency of electrolytic fuel cells and the like, and more particularly aluminum-air fuel cells, is described. The efficiency of the fuel cell is controlled by the rate of dissolution of Aluminum in an alkaline electrolyte and this rate can be increased dramatically by activating the surface of the anode with an activator such as Tin which is precipitated thereon. Self corrosion of the Aluminum anode, when the battery is not in use is a problem which is usually solved by using ultra pure Aluminum which is very expensive. The problem may be reduced by passivating the surface of the anode by electro-deposition of a passivating layer such as Pb. The passivating layer can be electrolytically removed to reactivate the battery before the activating layer is precipitated.

6 Claims, 3 Drawing Sheets

METHOD FOR IMPROVING EFFICIENCY OF ELECTRO-CHEMICAL CELLS

CROSS REFERENCE TO RELATED APPLICATION

This application is a continuation-in-part of my earlier filed U.S. patent application Ser. No. 07/735,349 filed Jul. 24, 1991 and now abandoned.

FIELD OF INVENTION

This invention relates to methods for improving the efficiency of electrolytic fuel cells, and more particularly to improvements in aluminum-air fuel cells.

BACKGROUND OF INVENTION

Aluminum and aluminum alloys, such as Al-Sn, Al-Mg-Sn and Al-Ca-Sn alloys, are of particular importance for use as the anode in galvanic cells for the production of electrical energy. It is known that the rate of dissolution of aluminum anodes can be significantly altered by the presence of certain "impurities" or additions, either alloyed in the anode itself or within the electrolyte surrounding the anode. For example additions of the salt's of Pt, Fe, Cu Ni, Au, Zn Hg and Pb to the electrolyte solution are known to precipitate on the surface of an Aluminum anode and inhibit the dissolution thereof. Additions of Sn ions to an electrolyte solution or in the Aluminum anode itself has been shown to be an activator. Whether the aluminum surface is activiated or passivated however, the effect is rarely uniform and local action causes pitting of the anode and the like, thereby reducing the electrical efficiency of the cell. Heretofore, it has generally been found necessary to employ ultra-pure aluminum (99.999%) as the base material of Aluminum anodes in order to avoid the problems of pitting corrosion and the like. Ultra pure aluminum is, however, extremely expensive to produce and low grades such as pure (99.85%) are to be preferred, and secondary steps are then necessary to reduce self corrosion. For example, U.S. Pat. No. 2,554,447 refers to the addition of zincates to the electrolyte to reduce self-corrosion. However, zinc is deleterious to electrical properties of the cell, and the purity of the Aluminum metal has to be determined by the opposing demands of the necessary electrochemical properties and the increased cost with increased purity. Various other alternatives such as additions of Ga, Mg and In to the anode or Va, In and Tl to an alkaline electrolyte have also been suggested. In every case, however, the emphasis has always been on either additions of an activator or of a passivator within a precisely defined range of concentrations. All of these systems are, therefore, a compromise between maximum energy efficiency (equivalent to minimum internal electrical resistance of the element) and minimum self corrosion (equivalent to protective surface layers on the anode material which results in increased internal resistance). These systems are inflexible and static in design and therefore not particularly suitable for use in modern battery systems which require high current densities, constant voltage, flexible load conditions, long shelf life, capable of intermittent usage and so on. There is therefore, a need to develop a battery and in particular an aluminum-air battery which maximises energy output while minimising self-corrosion.

OBJECT OF THE INVENTION

It is, therefore an object of the present invention to provide an Aluminum battery or fuel cell in which the electrochemical reactions which take place on the surface of the electrodes can be controlled, continuously and reversably, so as to optimize the performance of the electrodes under any given operating condition or requirement.

It is a further object of the invention to provide an aluminum electrode for an aluminum-air fuel cell which is based on technically pure (99.85%) or pure (99.99% Al) Aluminum and hence cheaper than ultra pure (99.999% Al) Aluminum electrodes. It is even contemplated that scrap Al may be used for anodes if the activation and passification process is properly controlled. This could lead to the recovery of technically pure Al as a by-product of electrical energy production.

These objects may be achieved by continuously controlling and adjusting the composition of the electrolyte in which the electrodes are immersed, so that either a passivating or an activating layer can be either deposited on or removed from the surface of the electrode, as dictated by the needs and condition of the cell.

BRIEF STATEMENT OF INVENTION

Thus, by one aspect of this invention there is provided a process for selectively and cyclically controlling dissolution and inhibition of a metallic electrode immersed in an aqueous electrolyte solution in a cell, comprising:

(a) electrodepositing a passivating layer onto said electrode so as to inhibit dissolution thereof;

(b) electrolytically removing said passivating layer from said electrode so as to provide an active electrode surface;

(c) electrodepositing an activating layer onto said active electrode surface so as to enhance the dissolution rate of said electrode and thus enhance energy production from said cell; and (d) electrolytically removing said activating layer from said electrode surface so as to provide an electrode surface receptive to electrodeposition a further said passivating layer.

By another aspect of this invention there is provided an electrolytic cell for generating electrical energy comprising:

a primary galvanic cell containing an electrolyte and an anode, and a cathode immersed therein an activating cell containing an activator electrode and a passivator cell containing a passivator electrode in fluid communication with said primary cell so that said electrolyte may be selectively circulated between said primary, activator and passivator cells;

means to apply an electrical potential to selected one of said anode, said activator electrode and said passivator electrode; and means to selectively control said potential of said anode, passivator electrode and said activator electrode so as to selectively deposit activating ions and passivating ions on said anode depending upon the selected anode of said electrolytic cell.

DETAILED DESCRIPTION OF PREFERRED EMBODIMENTS

Figure 1:
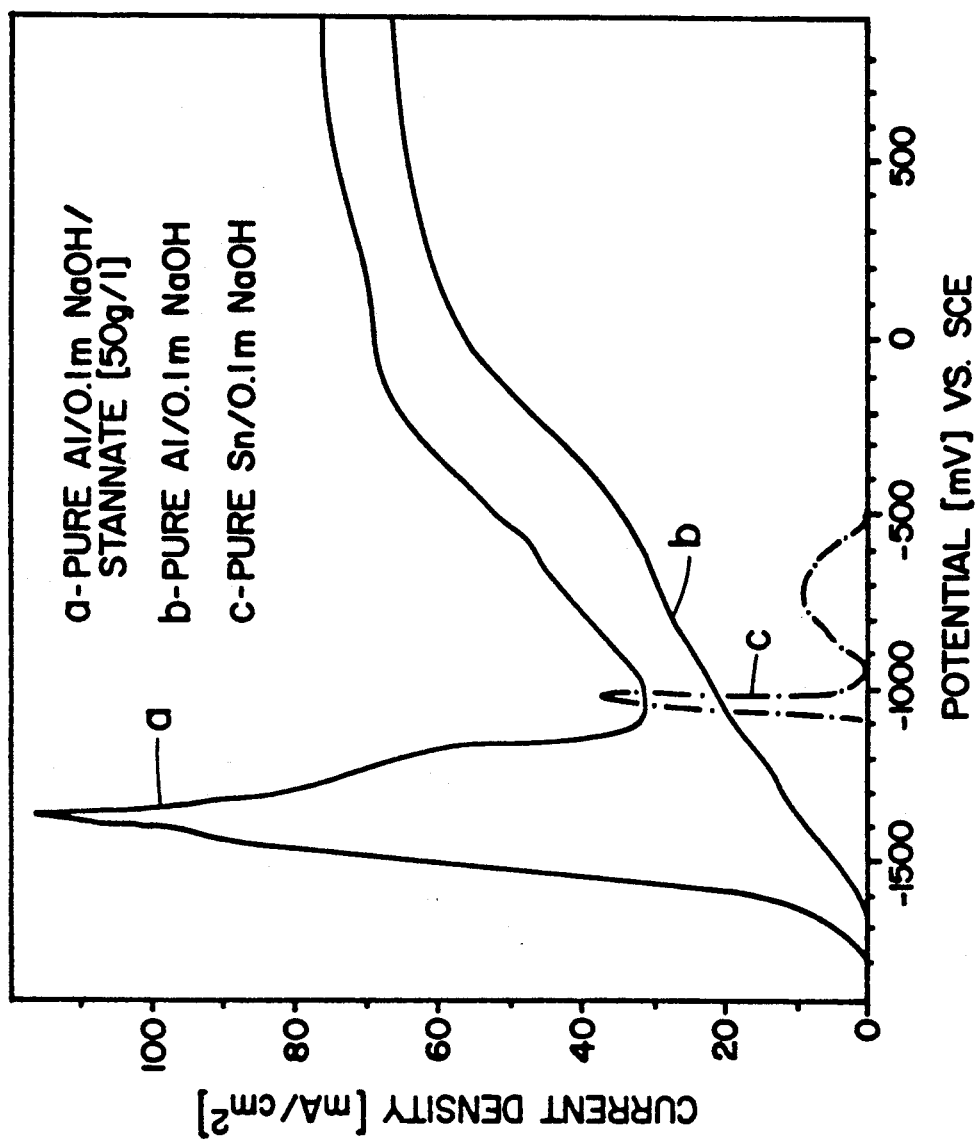
FIG. 1 is a graph illustrating the dissolution of pure aluminum, and pure Tin in an alkaline solution and the dissolution of pure Aluminum in an alkaline solution containing Tin ions (50 g/l)

As seen in FIG. 1, Aluminum dissolves in an alkali solution (0.1M NaOH) containing Tin ions at a rate which is at least an order of magnitude greater than in an alkaline solution which does not contain Tin ions. This activating feature is, however, limited by the negative potential at which Sn becomes stable as a metal, i.e. at about −1100 mV versus a standard calomel electrode (SCE). As soon as Sn begins to dissolve from an electrode, the activating property of Sn ions in the alkali solution disappears and the dissolution rate of the Aluminum drops to approximately that of Aluminum in a stagnate fuel alkaline electrolyte. It will be appreciated, therefore, that as Sn is dissolved in the electrolyte and is precipitated onto the Aluminum as metallic Sn at potentials more negative than −1100 mV, the Al now dissolves more readily and provides the anticipated power from the battery. If it is desired to shut the battery down, it is necessary to increase the potential of the Al-anode in the positive direction so that the Sn on the anode dissolves. The Sn can then be removed from the system either by changing the electrolyte or by precipitating the Sn onto an auxiliary electrode at the appropriate potential (−1100 mV) or less, as described in more detail hereinafter and from where it can be recycled by reversing the potential of the auxiliary electrode and thus reversing the whole process so that the battery again provides power.

Figure 2:
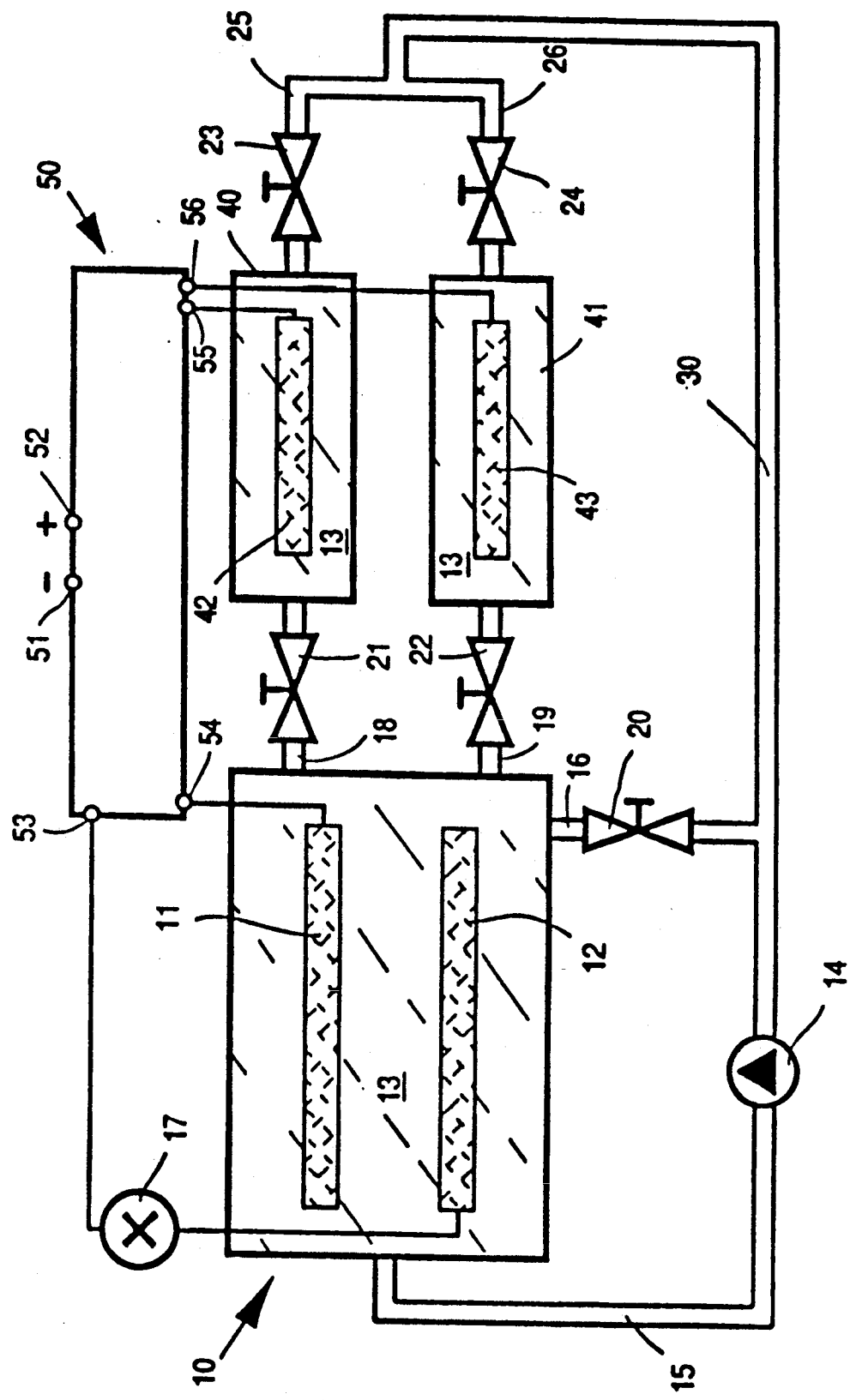
FIG. 2 is a schematic diagram of a battery according to one embodiment of the present invention.

As seen in FIG. 2, a primary galvanic cell 10 comprises an Aluminum anode 11 and an oxygen cathode 12 and an aqueous alkaline electrolyte 13. Electrolyte is circulated by a pump 14 via take off 16, shut off valve 20 and return line 15. Electrolyte may also be selectively diverted to an activator cell 40 via line 18 having a valve 21 and to a passivator cell 41 via line 19 and valve 22. The activator cell 40 contains an auxiliary Sn electrode 42 and the passivator cell 41 contains an auxiliary Pb electrode 43. Recirculation from a selected one of cells 40, 41 is effected via valves 23, 24 respectively which connect to pipe lines 25, 26 and thence to return to pipeline 30 and thence back to the primary cell 13 via pipeline 15 with valve 20 closed.

The anode 11 and cathode 12 are electrically connected to an electrical load device shown schematically at 17, and to a mode switch 50 at 53, 54. The auxiliary electrodes 42 and 43 are also connected to switch 50 at 55, 56 respectively. Switch 50 is provided with means 51, 52 for connection to an external power source (not shown), and is used to control and select the particular activation/passivation cycle required, as described in more detail hereinafter, by independently controlling the potential of the anode 11 and the auxiliary electrodes 42, 43, after calibration thereof.

Figure 3:
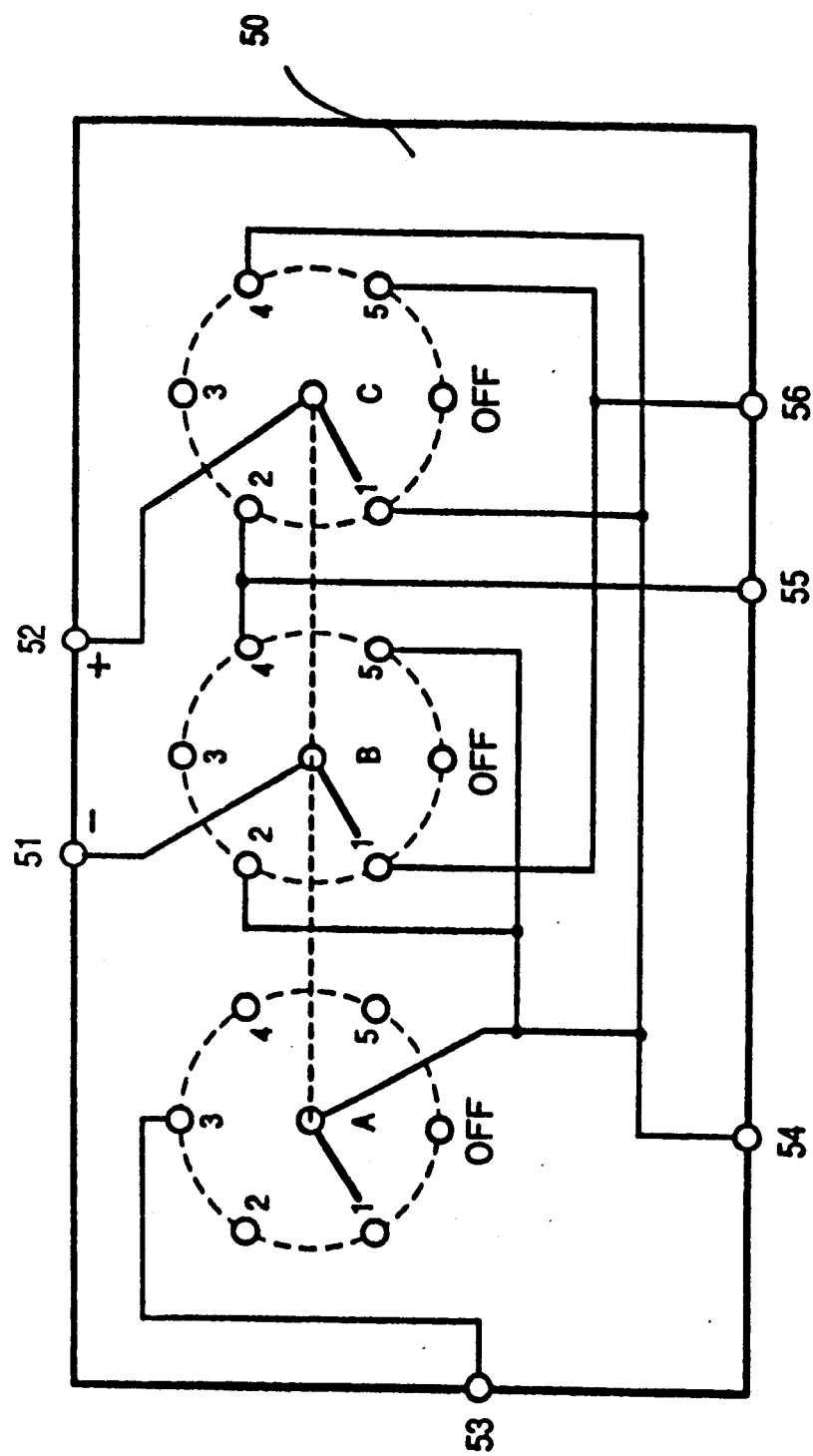
FIG. 3 is a circuit diagram of a switch to select the anodes for the Aluminum and auxiliary anodes of the embodiment shown in FIG. 2.

The operation of switch 50 is shown in more detail in FIG. 3, which illustrates three levels, A, B and C, of operation. The switch is designed so that it can only be operated in one diretion, shown clockwise in FIG. 3, in order to ensure the correct sequence of steps. Each level is shown as having five operating positions, 1–5 which correspond to the following:

OFF off;

1. Dissolve passivator from anode 11 and deposit onto passivator electrode 43;
2. Dissolve activator from activator electrode 42 and deposit activator onto anode 11;
3. Operating mode;
4. Dissolve activator from anode 11 and deposit onto activator electrode 42; and
5. Dissolve passivator from passivator electrode 43 and deposit passivator onto anode 11.

Thus it can be seen that level A only allows connection to the load device 17 via connector 53 only in mode 3. Mode switch levels B and C provide the necessary potentials to the auxiliary electrodes 42, 43 by means of the external power supply connectors 51, 52 to allow the reactions to take place as described in switch positions 1, 2, 4 and 5 respectively. Thus, from a state of rest in which the anode 11 is covered with a passivator (e.g. Pb), which reduces self corrosion, all valves are closed and the electrolyte is stagnant, the sequence is as follows: To activate the battery, valves 22 and 24 are opened, pump 14 is switched on and the anode 11 is polarized positive relative to passivator electrode 43. This permits the Pb passivator covering the anode 11 to go into solution and be pumped into the passivator cell 41 where it is deposited on electrode 43 when the depassification of anode 11 is complete, valves 22 and 24 are closed and valves 21 and 23 are opened. Activator electrode 42 is polarized positive relative to the anode 11, and the activator (e.g. Sn) goes into solution and is precipitated onto anode 11. This precipitation produces a highly activated surface, as described herein above, which means that an increased dissolution rate of Al can be achieved. Upon completion of the activation of anode 11, valves 21 and 23 are closed and valve 20 is opened so that electrolyte is simply cycled round primary cell 13 and power is produced by galvanic action, to energize a motor or other electrical load device 17. In order to shut the battery down, valve 20 is closed and valves 21 and 23 are opened, and anode 11 is polarized positively relative to electrode 42 so that the activator surface Sn dissolves and is precipitated on electrode 42. Valves 21 and 23 are then closed and valves 22 and 24 are opened and electrode 43 is polarized positive relative to anode 11 so that the Pb passivator is dissolved from electrode 43 and is precipitated onto Aluminum anode 11, thereby passivating it and limiting its ability to self corrode. Once the anode 11 is passivated pump 14 is turned off and all valves are closed.

It will be appreciated by those skilled in the art that while this invention has been illustrated by reference to an Aluminum-air cell which is activated by precipitation on Sn on the Aluminum anode and passivated by precipitation of Pb on the anode, many other activations and passivations are equally applicable and the present invention is not limited solely to Sn and Pb. For example Ni, or Zn could be employed as the passivator, and In, Ga and possibly Cu could also be used as the activator. Further, while the invention has been described with reference to an Aluminum-air battery, the principles thereof can be applied to other environments. For example, by careful selection of the potential, scrap Aluminum alloys could be used as the anode and activated and passivated accordingly. Smearing of Al-Si cylinder block walls by the Al-piston rings commonly employed in conjunction therewith may be reduced by passivating the surfaces by means of the present invention instead of the costly and non-uniform electrochemical etching presently employed. Aluminum foil, used in electrolytic condensers may also be activated and passivated using the principles of the present invention.

I claim:

1. A process for selectively and cyclically controlling dissolution and inhibition of a metallic electrode immersed in an aqueous electrolyte solution in a cell, comprising:
   (a) electrodepositing a passivating layer onto said electrode so as to inhibit dissolution thereof;
   (b) electrolytically removing said passivating layer from said electrode so as to provide an active electrode surface;
   (c) electrodepositing an activating layer onto said active electrode surface so as to enhance the dissolution of said electrode and thereby increase energy production from said cell; and
   (d) electrolytically removing said activating layer from said electrode surface so as to provide an electrode surface receptive to electrodeposition of a further said passivating layer.

2. A process as claimed in claim 1 wherein said metallic electrode is an Aluminum electrode.

3. A process as claimed in claim 2 wherein said Aluminum is at least 99.85%.

4. A process as claimed in claim 3 wherein said electrolyte is an aqueous alkaline electrolyte.

5. A process as claimed in claim 4 wherein said activating layer is a Tin layer.

6. A process as claimed in claim 5 wherein said passivating layer is a lead layer.

* * * * *